United States Patent [19]

Gump

[11] 4,288,055
[45] Sep. 8, 1981

[54] MOUNTING BRACKET

[76] Inventor: William E. Gump, 12114 SE. 19th, Milwaukie, Oreg. 97222

[21] Appl. No.: 135,524

[22] Filed: Mar. 31, 1980

[51] Int. Cl.³ .............................................. E04G 5/06
[52] U.S. Cl. .................................. 248/226.1; 224/331
[58] Field of Search ................. 248/226.1, 226.2, 228; 24/263 A; 224/322, 329, 330, 331, 42.11, 42.45 R; 296/3, 7, 167

[56] References Cited

U.S. PATENT DOCUMENTS

| 3,260,929 | 7/1966 | Hedgepeth | 224/331 X |
| 3,381,866 | 5/1968 | Wickett | 224/331 X |
| 3,451,712 | 6/1969 | Power | 296/167 |

FOREIGN PATENT DOCUMENTS

| 2102440 | 6/1979 | Fed. Rep. of Germany | 224/329 |
| 1549522 | 11/1968 | France | 224/331 |

Primary Examiner—J. Franklin Foss
Attorney, Agent, or Firm—Adrian J. LaRue

[57] ABSTRACT

A mounting bracket having a P-shape to be clampingly secured along a drip gutter of a vehicle wherein a brace means extends between first and second leg means and a clamping plate is movably mounted onto the first leg means for clampingly securing the mounting bracket onto the drip gutter.

7 Claims, 4 Drawing Figures

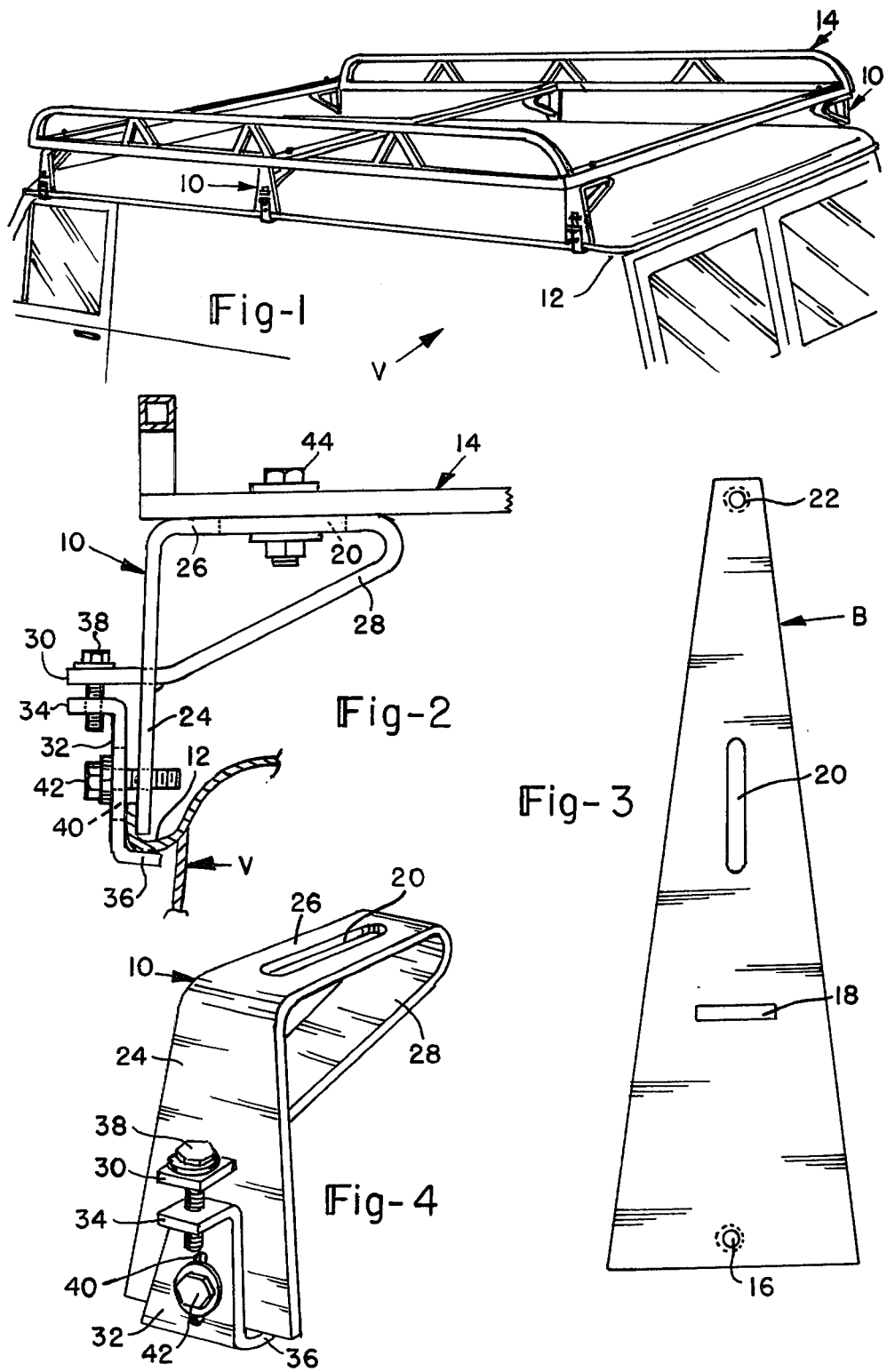

MOUNTING BRACKET

BACKGROUND OF THE INVENTION

Mounting brackets for mounting onto the drip gutter of a vehicle are known. They are made from cast aluminum and include an engaging section which engages the inside surface of the drip gutter and a clamping plate which engages the outside bottom surface of the drip gutter. A cam-actuated member is connected to the clamping plate for clampingly securing the mounting bracket in position along the drip gutter. The engaging section extends into an arcuate leg which has a collar pivotally mounted at its free end.

Such mounting brackets are clampingly secured in pairs opposite each other onto the drip gutter of a vehicle with tubular members secured within the collars to form a rack for carrying light loads. These mounting brackets cannot carry heavy loads because they are not strong enough for such loads. Even light loads can present a problem because of the mounting brackets being made of cast aluminum and being subject to breakage due to the frangible nature of cast metal.

SUMMARY OF THE INVENTION

The present invention relates to mounting brackets and more particularly to mounting brackets for mounting on drip gutters of a vehicle.

The present invention is realized by mounting brackets that are formed of steel or like material and which comprises a first leg, the bottom of which is to engage the bottom inside surface of the drip gutter, a second leg at substantially right angles to the first leg and a third leg disposed at about forty five degrees with respect to the first and second legs with the free end of the third leg extending through a slot about midway of the first leg, the third leg defining a brace between the first and second legs and the free end of the third leg being at about right angles with respect to the first leg. The first and third legs are welded together where the free end extends through the first leg. A clamping plate movably extends along the first leg between the bottom and the free end of the third leg and it includes a first section extending along the bottom of the first leg for engaging the outside bottom surface of the drip gutter and a second section parallel with respect to the free end, securing means extend between the first leg and the clamping plate and the free end and the second section for clampingly securing the mounting bracket in position along the drip gutter. An elongated opening is provided in the second leg to enable a mounting rack or cross bar to be secured onto the mounting bracket.

An object of the present invention is to provide a mounting bracket for mounting onto the drip gutter of a vehicle that is strong to enable heavy loads to be carried thereby.

Another object of the present invention is the provision of a mounting bracket that includes a third leg that extends between the first and second legs to define a brace therefor.

A further object of the present invention is to provide a mounting bracket that has the free end of a third leg extending through a slot in the first leg with the free end providing a base for one of the securing means of a clamping plate.

An additional object of the present invention is the provision of a mounting bracket that has an elongated opening in the second leg to enable mounting racks or cross bars to be adjustably mounted thereon.

Still a further object of the present invention is to provide P- shaped mounting bracket means including movable clamping plate means for securing the mounting bracket means in position along a drip gutter of a vehicle onto which is adjustably secured rack or cross bar means for carrying heavy loads.

The foregoing and other objects of the present invention will appear more fully from the following description and the accompanying drawing which illustrate a preferred embodiment of the invention. It is to be understood that changes may be made from the exact details shown and described without departing from the principles of the invention.

BRIEF DESCRIPTION OF THE DRAWING

FIG. 1 is a perspective view of a vehicle showing the mounting brackets mounted in position along the drip gutter thereof, with a carrying rack secured thereto;

FIG. 2 is a side elevational view showing the mounting bracket mounted in position along a drip gutter; and FIG. 3 is a top plan view of a blank of the mounting bracket prior to being formed into the mounting bracket; and FIG. 4 is a perspective view of the mounting bracket.

DETAILED DESCRIPTION OF THE INVENTION

Turning now to the drawings, a vehicle V has mounting brackets 10 removably secured along drip gutter 12. A carrying rack 14 is secured onto mounting brackets 10.

FIG. 3 shows a metal blank B before it is formed into mounting bracket 10. The metal is preferably steel but can be made from any suitable metal for the entended purpose. As can be discerned, metal blank B has a somewhat triangular configuration and it includes a threaded hole 16, a slot 18, an elongated opening 20 and a hole 22.

Metal blank B is formed into a P configuration having a first leg 24, a second leg 26 at substantially right angles with respect to first leg 24 and second leg 26 with the free end extending through slot 18 and outwardly beyond first leg 24 therely defining a base 30 which is disposed at substantially right angles with respect to first leg 24. Third leg 28 is welded to first leg 24 where the third leg extends through slot 18. Third leg 28 forms a brace between first leg 24 and second leg 26.

Clamping plate 32 is a Z- shaped metal plate preferably of the same metal as that of metal blank B and it has an upper projection 34 and a lower projection 36. A threaded hole (not shown) is provided in upper projection 34 and it threadably receives a bolt 38 which extends through hole 22 in base 30. An elongated opening 40 is provided in clamping plate 32 and a bolt 42 extends through elongated opening 40 and threadably engages threaded opening 16.

In operation, the bottom of first leg 24 is positioned in engagement with the bottom of the inside surface of drip gutter 12. Lower projection 36 is positioned against the bottom outside surface of drip gutter 12 and against the side of drip gutter 12. Bolt 38 is tightened to clampingly secure lower projection 36 against the bottom outside surface of drip gutter 12 and bolt 42 is tightened to clampingly secure first leg 24 and clamping plate 32 to drip gutter 12.

In this way bolt 38 clamps in an upward direction and bolt 42 clamps in an inwarded direction which clampingly secures mounting bracket 10 in position along drip gutter 12 with legs 26 and 28 extending along the roof of the vehicle V.

After mounting brackets 10 are clampingly secured along drip gutter 12, carrying rack 14 is secured thereto by bolts 44 that extend through elongated openings 20. U-shaped cross bars can be mounted on mounting brackets 10 instead of carrying rack 14. Elongated opening 20 enables rack 14 or the cross bars to be mounted on vehicles having different widths across their tops.

SUMMARY

The present invention is directed to mounting bracket means for being clampingly secured along a drip gutter of a vehicle which has a P- shaped configuration and on which is secured a carrying rack for carrying loads and especially heavy loads. Brace means extend between first and second leg means which are at right angles to one another which provides the mounting bracket means with strength. Clamping plate means is adjustably secured to the first leg means to clampingly secure the mounting bracket means to the drip gutter. Carrying rack means or cross bar means can be adjustably mounted on the mounting bracket means. Although the invention has been explained with reference to a particular embodiment, it is to be appreciated that various adaptations and modifications may be made without departing from the appended claims.

The invention is claimed in accordance with the following:

1. A mounting bracket for clampingly being clamped onto a drip gutter of a vehicle, comprising:
   first leg means and second leg means disposed at right angles to one another, said first leg means being disposable within the drip gutter;
   third leg means extending between said first and second leg means defining a brace therebetween;
   said first leg means has a slot therethrough and a free end of said third leg means extends through said slot and extends beyond said first leg means therely defining base means;
   clamping-plate means movably mounted along said first leg means including an inwardly-directed projection extending along the bottom of said first leg means and engagable with a bottom outside surface of the drip gutter; and
   securing means provided between said first leg means and said clamping-plate means and between said base means and said clamping-plate means for clampingly securing said inwardly-directed projection against the bottom outside surface of the drip gutter and said clamping-plate means against the side of the drip gutter.

2. A mounting bracket according to claim 1 wherein said third leg means is an extension of said second leg means and said third leg means is secured to said first leg means.

3. A mounting bracket according to claim 1 wherein said base means is disposed at substantially right angles with respect to said first leg means and said outwardly-directed projection is disposed substantially parallel with respect to said base means.

4. A mounting bracket according to claim 1 wherein said first, second and third leg means has a P- shaped configuration.

5. A mounting bracket according to claim 1 wherein said clamping plate means has a Z-shape.

6. A mounting bracket according to claim 1 wherein said second leg means has an elongated opening therein for adjustably securing carrying rack means thereon.

7. A mounting bracket for clampingly being clamped onto a drip gutter of a vehicle, comprising:
   first leg means and second leg means disposed at right angles to one another, said first leg means being disposable within the drip gutter;
   third leg means extending between said first and second leg means defining a brace therebetween;
   base means provided along said first leg means;
   clamping-plate means movably mounted along said first leg means including an inwardly-directed projection extending along the bottom of said first leg means and engagable with a bottom outside surface of the drip gutter; and
   securing means provided between said first leg means and said clamping-plate means and between said base means and said clamping-plate means for clampingly securing said inwardly-directed projection against the bottom outside surface of the drip gutter and said clamping-plate means against the side of the drip gutter.

* * * * *